United States Patent [19]

Horstmann et al.

[11] 4,206,661

[45] Jun. 10, 1980

[54] DRIVE MECHANISM FOR A MOTOR VEHICLE

[75] Inventors: Bernhard Horstmann, Korschenbroich; Reinhard Wesemeier, Neuss, both of Fed. Rep. of Germany

[73] Assignee: International Harvester Company, Chicago, Ill.

[21] Appl. No.: 912,595

[22] Filed: Jun. 5, 1978

Related U.S. Application Data

[62] Division of Ser. No. 732,625, Oct. 15, 1976, Pat. No. 4,137,794.

[51] Int. Cl.² .................... B60K 17/00; F16H 57/02
[52] U.S. Cl. ......................... 74/606 R; 180/70 R; 181/204
[58] Field of Search ............. 74/606 R; 64/32 R, 3, 64/1 V, 4; 180/70 R; 181/204; 267/140, 141

[56] References Cited

U.S. PATENT DOCUMENTS

| | | | |
|---|---|---|---|
| 3,231,255 | 1/1966 | Olson | 92/85 R |
| 3,231,256 | 1/1966 | Olson | 267/141 X |
| 3,543,536 | 12/1970 | Rekow | 64/32 X |
| 3,797,604 | 3/1974 | Davis | 296/35 R |
| 3,991,735 | 11/1976 | Horstmann | |
| 4,019,600 | 4/1977 | Master et al. | 74/606 R |
| 4,020,651 | 5/1977 | Callies | 64/1 V |

*Primary Examiner*—Irwin C. Cohen
*Attorney, Agent, or Firm*—Raymond E. Parks; Frederick J. Krubel; F. David AuBuchon

[57] ABSTRACT

There is provided a resilient connection between an engine and a transmission housing, of a vehicle of the open frame type, for dampening engine generated noise which is transmitted to the frame via the transmission housing. The resilient connection comprises rubber rings or cups on metallic spacer bushings compressed between the engine and housing. There is also an axially telescopic drive shaft from the engine to the transmission which accepts limited angular movement between the engine and housing in the plane of the resilient connection.

4 Claims, 4 Drawing Figures

DRIVE MECHANISM FOR A MOTOR VEHICLE

This is a division of application Ser. No. 732,625, filed Oct. 15, 1976, now U.S. Pat. No. 4,137,794.

BACKGROUND OF THE INVENTION

This invention relates to a drive mechanism for a motor vehicle of the open frame type, such as a farm tractor in particular, featuring an internal combustion engine and a transmission, whereby a housing accommodating the transmission is connected to a housing or frame accommodating the internal combustion engine.

FIELD OF THE INVENTION

Generally, motor vehicles can be given a so-called frame-like type of construction or a so-called unit construction. With a frame-like construction the liberated loads are absorbed by a frame connected to the internal combustion engine. With a unit construction, the internal combustion engine, via an intermediate housing, for example a clutch housing, is directly and rigidly connected to the transmission housing, so that this unit represents the supporting element for the vehicle body. With a farm tractor, said unit construction is the preferred mode of design.

Contrary to a normal highway vehicle, a tractor is generally characterized by a comparatively open design. Therefore, not only persons in the vicinity of the tractor, but most of all, the tractor driver and the construction personnel are irritated and endangered by the noise level of the tractor. Despite observance of all legal requirements presently in force, there is still an attributable health hazard due to the noise level in the vicinity of the tractor, particularly to the driver's ears. Doubtlessly these disadvantages can be improved upon considerably for the driver by providing a cabin superstructure. However, the noise hazard to the other construction personnel and, generally, the environment noise pollution can only be diminished by reducing the level of noise emitted by the tractor.

It is generally known that the overall tractor noise is influenced to a considerable extent by the noise emitted by the surfaces of the internal combustion engine. The noise emitted by the engine surfaces originates from the interior of the engine and is the result of rapid pressure changes during combustion and of intermittently proceeding mechanical actions. Since the reactions generating the noise can be attenuated to a limited extent only, only a comparatively slight reduction of the engine noise can be attained. Similar facts apply to the effects of improvements carried out on individual components of the engine surface. Therefore, in recent years we noticed an increasing trend of providing the entire internal combustion engine with a sound-muffling total enclosure to reduce the noise emitted by the engine surface such as is shown in U.S. patent application No. 633,335, filed on Nov. 19, 1975, by Horstmann now U.S. Pat. No. 3,991,735, dated Nov. 16, 1976. Although these sound-absorbing casings yield a noticeable improvement, they still present the disadvantages of being rather expensive, of impairing the access to the internal combustion engine, and, which is very important, of creating problems with the heat balance. No one has found any complete solutions for these problems. Of considerable disadvantage is the fact that by the rigid connection between the internal combustion engine and the clutch housing or the transmission housing respectively, the solid-borne vibration emanating from the internal combustion engine can be transmitted along the entire length of the chassis of the vehicle. Thus, exciting all units of the vehicle to an even increased noise emission, an effect which is particularly detrimental as far as the driver of the vehicle is concerned.

Therefore, the invention is based on the objective of providing a drive mechanism, of the initially mentioned kind, on which, however, a sound radiation from the internal combustion engine onto the clutch housing or transmission housing respectively is largely prevented. Thus, on the whole, a noticeable noise reduction is achieved on the vehicle. According to the invention this problem is solved by providing an elastomeric intermediate layer between the casing of the internal combustion engine and the transmission housing. By the installation of such an interlining at the specified location, the solid-borne vibration (sound) is no longer carried from the internal combustion engine to the transmission housing and, as regards the vehicle, a distinct noise reduction is achieved.

It is well-known practice to reduce noise on vehicles by applying elastic means. However, up till now the entire internal combustion engine was elastically suspended in the chassis frame. It was even tried to produce a noise reduction by appropriately insulating individual elements with large surfaces, i.e. fenders. However, up till now nobody thought of providing an elastic connection between the internal combustion engine and the transmission. Obviously, such a solution was never considered because designers were afraid of impairing the necessary rigidity by such measures and thus of not being able to control the angular changes encountered.

SUMMARY OF THE INVENTION

In an expedient design according to the invention the elastomeric intermediate layer is arranged between the actual transmission housing and the clutch housing which is designed as part of the transmission housing. In an expedient design both, the clutch housing and the transmission housing, have radially outward projecting flanges on which the elastomeric intermediate layer is arranged.

The intermediate layer can be designed in a variety of ways. One design proves to be particularly suitable. In this case the intermediate layer is formed by attenuation elements arranged on either side of the flange provided on the clutch housing. Tests proved that this way, at the driver's ear, a noise reduction between 3 and 4 dB(A) approximately can be achieved without applying any additional means.

In a preferred embodiment, according to the invention, one of the attenuating elements is located on the inner side of the flange provided on the clutch housing and it consists of a flat annular rubber seal, the width of which approximately corresponds with the width of the flange, while the attenuating element located on the outer side of the flange provided on the clutch housing consists of a narrower flat rubber seal resting against a counter-plate. In the case of such a connection the flange on the transmission housing and the counterplate can easily be rigged together by a bolt passed through a space bushing used as intermediary.

By appropriate dimensioning of the length of the space bushing and depending on actual requirements the annular rubber seals can be given either a lesser or stronger pretensioning.

To absorb the forces acting in a radial direction, a rubber-coated round-bar spring can be arranged around the space bushing, whereby the length of the spring is slightly shorter than that of the space bushing.

BRIEF DESCRIPTION OF THE DRAWING

Preferred embodiments according to the invention are pictured in the various figures of the drawing and are explained in detail in the following.

DESCRIPTION OF THE PREFERRED EMBODIMENT

Figure 1:
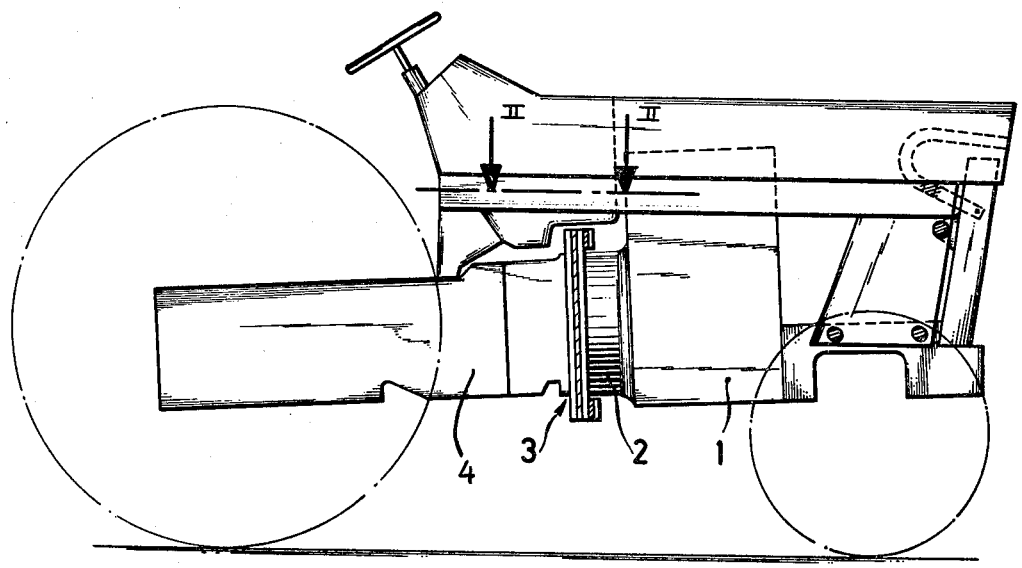
FIG. 1 shows a diagrammatic representation of a farm tractor.

The tractor shown in FIG. 1 has an internal combustion engine frame 1, a clutch housing 2 firmly bolted onto the engine frame, and a transmission housing 4 resiliently connected to the clutch housing 2 by means of an elastic intermediate layer 3.

Figure 2:
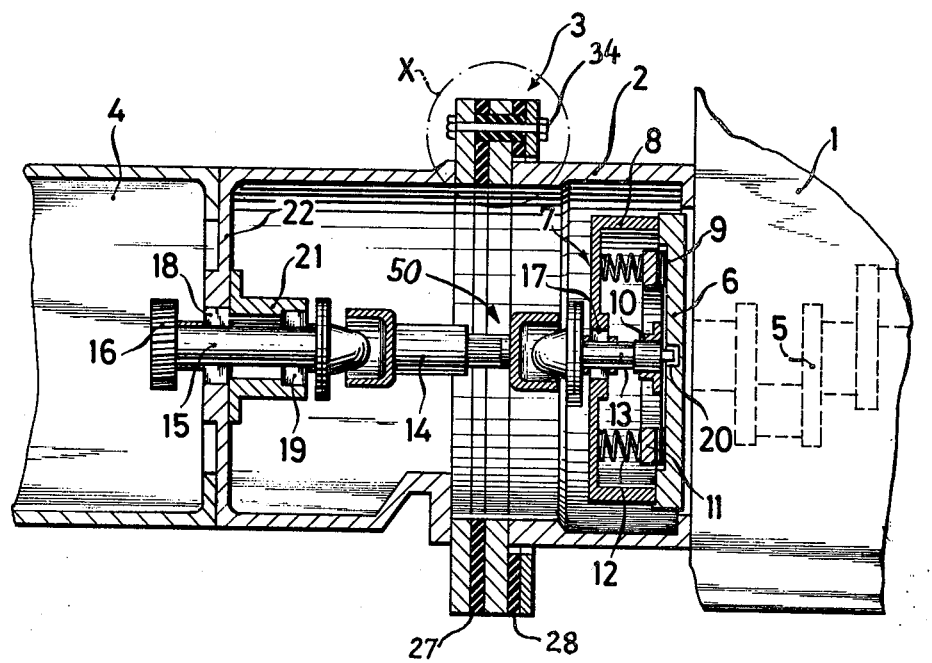
FIG. 2 shows a sectional view of the vehicle along line II—II of FIG. 1.

As FIG. 2 shows, a crankshaft 5 of the internal combustion engine is connected to a flywheel 6 which is located inside the clutch housing 2 accommodating a clutch 7. Being of a conventional design, the clutch 7 comprises a supporting member 8, a friction disk 9, and a thrust ring 11. Compression springs 12 engage at one end on the thrust ring 11 and at the other end they rest on the supporting member 8. An output shaft 13 is connected to the flywheel 6. On the shaft 13, in a known manner, a hub 10 is mounted, which is connected to the friction disk 9. The disengaging mechanism of the clutch is not shown in detail. By means of a drive shaft 14, the output shaft 13 is engaged to one end of a connecting shaft 15. The other end of the connecting shaft 15 has a gear wheel 16 mounted thereon. The gear wheel 16 extends inside the transmission housing 4. By means of the bearings 17 and 20 the output shaft 13 is journally supported in the supporting member 8. The connecting shaft 15, at the gear end 16, is rotatably supported by a bearing 18 carried in an intermediate wall 22 provided in the transmission housing 4. A bearing carrier 21 is connected to the intermediate wall 22 and carries a bearing 19 supporting the drive shaft facing end of connecting shaft 15. The drive shaft 14 is axially telescopic and provides means 50 for permitting limited angular movement between the engine 1 and the housing 4 in the plane of the elastomeric intermediate layer 3.

As already mentioned above, an elastomeric intermediate layer is arranged between the clutch housing 2 and the transmission housing 4. By means of the elastomeric layer, a sound propagation from the internal combustion engine and the clutch housing respectively to the transmission housing 4 is prevented.

Figure 3:
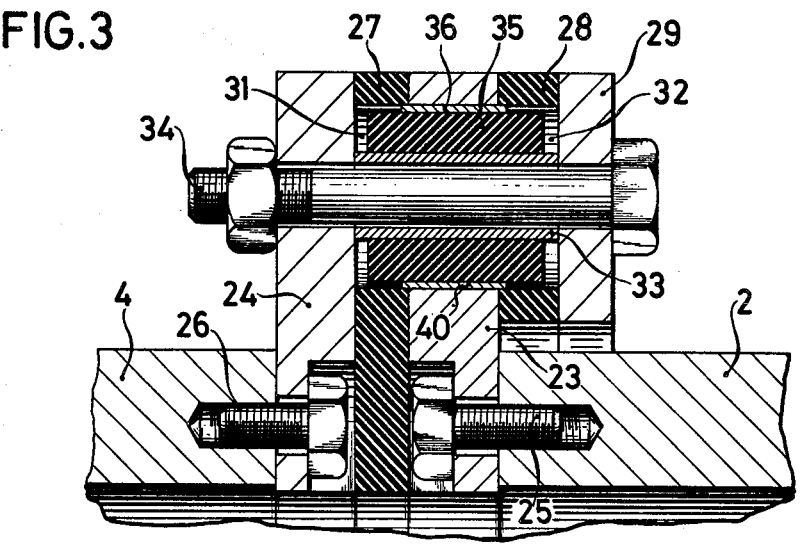
FIG. 3 shows an enlarged sealing connection taken at the area X in FIG. 2.

As shown in detail in FIG. 3, the elastomeric intermediate layer 3 is arranged between a flange 23 provided on the clutch housing 2 and a flange 24 provided on the transmission housing 4. According to the embodiment shown in FIGS. 1 through 3, the flanges 23 and 24 are respectively bolted in a detachable manner, by means of bolts 25 and 26, to the clutch housing 2 and to the transmission housing 4. Between the flange 23 provided on the clutch housing 2 and the flange 24 provided on the transmission housing 4, a dampening element is arranged which is designed in form of a flat rubber ring 27 having an outer periphery approximately equal with that of the flanges 23 and 24. A counterplate 29 encircles the clutch housing. Between the counterplate 29 and the flange 23, a second flat rubber ring 28 is provided. The two rubber rings 27 and 28 are provided with holes 31 and 32 respectively through which a space bushing 33 extends. The length of the space bushing 33 determines the distance between the counterplate 29 and the flange 24 provided on the transmission housing. A screw-type bolt 34 is pushed through the space bushing 33. By means of the bolt 34 the counterplate 29 and the flange 24, provided on the transmission housing 4 are held together; and simultaneously the two rubber rings 27 and 28 are kept at a certain compression. The space bushing 33 is surrounded by a rubber spring 35, the length of which is slightly less than that of the space bushing 33. The opposite ends of rubber spring 35 protrude into the holes 31 and 32 provided in the rubber rings 27 and 28.

Around the circumference of the rubber spring 35 a guide sleeve 36 is arranged in a recess 40 of the flange 23 provided on the clutch housing. The opposite ends of the guide sleeve 36 also protrude slightly into the holes 31 and 32 provided in the rubber rings 27 and 28.

By the above described arrangement of an elastomeric layer 3 the path of sound propagation between the clutch housing 2 and the transmission housing 4 is interrupted, thus eliminating any transmission of sound. Tests conducted on an internal combustion engine of approximately 80 HP produced a noise reduction by 3 to 4 dB(A) at the driver's ear.

As regards the drive, any possible occurring angular changes between the clutch housing 2 and the transmission housing 4 are compensated by the drive shaft 14 which has a telescopic splined connection 50 between the clutch housing 2 and transmission housing 4.

DESCRIPTION OF A PREFERRED MODIFIED EMBODIMENT

Figure 4:
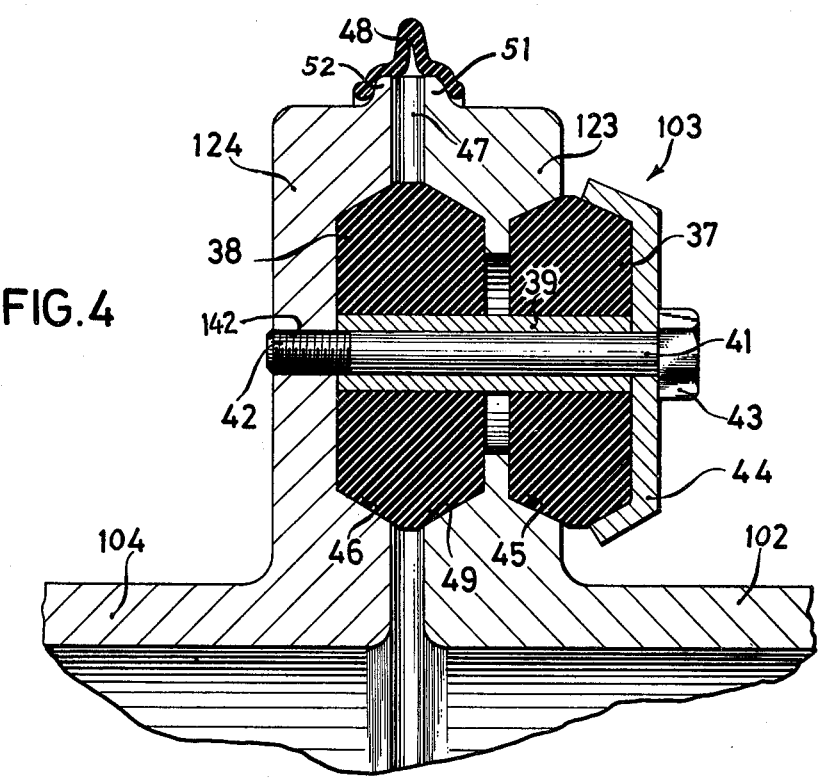
FIG. 4 shows a modified embodiment of the FIG. 3 arrangement.

A modified embodiment of the elastomeric intermediate layer is shown in FIG. 4. Contrary to the initially described specific embodiment, in this case the flanges 123 and 124 are designed in one piece with the clutch housing 102 and the transmission housing 4 respectively. On this embodiment the elastomeric intermediate layer 103 consists of rubber cups 37 and 38 arranged along the circumference, whereby the cross section of the rubber blocks is of elongated hexagonal shape. The rubber cups 37 and 38 are fitted on a bearing bushing 39 through which a clamping bolt 41 is inserted. One end of the bolt 41 has a thread 42 by means of which it is screwed into a threaded hole 142 in the flange 24 of the transmission housing 104. On the other end of the bolt 41 there is a hex-head 43 which rests against a pressure plate 44. The pressure plate 44 partly embraces the outer rubber cup 37. With approximately half of their volume, the rubber cups 37 and 38 rest in recesses 45, 46, 49, which are of trapezoidal cross section and are provided on both sides of the flange 123 on the clutch housing 102 and in one side of the flange 124 on the transmission housing 104. By tightening the clamping bolt 41 the required connection as well as the compressing of the rubber blocks 37 and 38 is achieved. To seal the inner space 47 between the flanges 123 and 124 an elastic circular packing washer 48 is sleeved over the flanges 123 and 124 which have annular lips 51 and 52 seating the seal ring 48.

It is to be understood that the invention is not limited to the embodiments described in the specification and shown in the various figures of the drawing, but also allows for modifications within the scope of the claims. This way the elastomeric intermediate layers 3 or 103 not only can be used on tractors designed by applying a unit construction system, but also can be used on tractors with a frame-type design on which the internal combustion engine is elastically supported on the frame. In this case the elastomeric layers 3 or 103 described in this invention can be installed additionally between the housing of the internal combustion engine and the transmission housing, so that an additional noise reduction is achieved. It stands to reason that the number of clamping points between the flanges or between counterplate and pressure plate depends on the size of the drive mechanism. On principle, it is also possible to arrange the elastomeric intermediate layer directly between the housing of the internal combustion engine and the clutch housing. Furthermore, the connection between the output shaft and the main drive shaft (intermediate shaft) does not need to be effected by means of a universal joint shaft, but can also be effected by either using a hypoid tooth coupling, rubber elements, or a hydraulic transmission. Finally, the elastic connection can also be established by an elastomeric layer vulcanized onto the opposed contact faces of the housings to be connected.

The embodiments of the invention in which an exclusive property of priviledge is claimed are defined as follows:

1. A tractor type of vehicle for use in agricultural and industrial operations comprising: an internal combustion engine; a transmission; a clutch, the clutch having a housing connected to the internal combustion engine and the transmission having a housing connected to the clutch housing, the clutch housing and transmission housing each having radially extending external flanges and the flanges having annular external lips; a plurality of circumferentially spaced pairs of first and second rubber blocks of substantially hexagonal cross section, the first block of each pair positioned between facing sides of the flanges and the second block of each pair positioned on an external side of the clutch housing flange, the facing sides and the external side of the flanges having longitudinally aligned recesses corresponding to the shape of the first and second blocks, the first block nesting in the recesses in the facing sides and the second block nesting in the recess in the external side; means for permitting limited angular movement between the transmission and clutch housings comprising an axially telescopic drive shaft connection from the clutch to the transmission within the area of the connection of the transmission housing flange to the clutch housing flange; a pressure plate having a depression complementary with and seated on a non-flange facing side of the second block, the first and second blocks and the pressure plate each having a central axially aligned opening, a tubular bushing carried in the openings of the first and second blocks; a bolt means passing through the opening in the plate and through the tubular bushing for clamping the first and second blocks against the recesses and the depression; and a sealing ring sleeved over the lips of the flanges for sealing the space between the facing sides of the flanges.

2. A tractor according to claim 1, wherein a threaded opening is provided in the transmission housing flange, and the bolt means is screwed into the threaded opening.

3. A tractor according to claim 1, wherein the first cup is bonded in the recess in the external side of the clutch housing flange and the second cup is bonded in the recess in the transmission housing flange, each cup bonded in the respective recess by vulcanization.

4. A tractor according to claim 1, wherein the first and second cups are bonded by vulcanization in the recesses on opposite sides of the clutch housing flange.

* * * * *